US005492493A

United States Patent [19]

Ohkita

[11] Patent Number: 5,492,493

[45] Date of Patent: Feb. 20, 1996

[54] REMOTE CONTROL DEVICE FOR MARINE PROPULSION UNIT

[75] Inventor: Ryozo Ohkita, Hamamatsu, Japan

[73] Assignee: Sanshin Kogyo Kabushiki Kaisha, Hamamatsu, Japan

[21] Appl. No.: 271,451

[22] Filed: Jul. 7, 1994

[51] Int. Cl.[6] .......... B60K 41/04

[52] U.S. Cl. .......... 440/86; 440/87

[58] Field of Search .......... 440/84, 86, 87; 74/480 B; 477/112

[56] References Cited

U.S. PATENT DOCUMENTS

| | | | |
|---|---|---|---|
| 3,224,291 | 12/1965 | Zimmerman | 477/112 |
| 3,640,155 | 2/1972 | Waner et al. | 477/112 |
| 5,056,379 | 10/1991 | Den Ouden | 74/480 B |
| 5,083,951 | 1/1992 | Baba | 440/86 |
| 5,094,122 | 3/1992 | Okita | 440/87 |
| 5,214,977 | 1/1993 | Nagafusa | 440/84 |
| 5,280,282 | 1/1994 | Nagafusa et al. | 180/321 |

FOREIGN PATENT DOCUMENTS

| | | | |
|---|---|---|---|
| 0000589 | 1/1991 | Japan | 440/87 |

*Primary Examiner*—Sherman Basinger
*Attorney, Agent, or Firm*—Knobbe, Martens, Olson & Bear

[57] ABSTRACT

A remote control operator for a marine propulsion transmission and throttle control that is operated by a single control lever. The single control lever's position is sensed and a single servomotor is operated which operates both the transmission control and throttle control through a cam and follower mechanism. A warmup control is also incorporated that permits partial opening of the throttle for warmup operation.

12 Claims, 10 Drawing Sheets

REMOTE CONTROL DEVICE FOR MARINE PROPULSION UNIT

BACKGROUND OF THE INVENTION

The present invention relates to a remote control device for a marine propulsion unit for controlling the propulsion unit through remote controlled operation.

PRIOR ART

Shift between forward and reverse navigation of marine propulsion units such as outboard motors and stern drives has been conventionally performed by connecting the operation lever in a cockpit through mechanical cables to the propulsion unit and operating the operation lever. This type of remote control device, however, has a problem that the operation lever requires a greater effort when there are cockpits in more than one location such as in the cabin and a flying bridge. This problem is caused by increase in resistance of reciprocating movements of the mechanical cables each connected to each operation lever in each cockpit and joined together at a mechanical junction box, and further connected to the propulsion unit. This phenomenon is remarkable with a single lever type remote control for performing the throttle control and forward/reverse shift by a single lever.

As a remote control device to solve the above problem, there is one that performs throttle and shift operations of the propulsion unit by means of a motor-operated actuator. This type of motor-operated remote control system will be described in reference to FIG. 10.

FIG. 10 is a schematic view of a conventional remote control device for a marine propulsion unit. In the drawing are shown: a marine propulsion unit, and a remote control device for the marine propulsion unit. The remote control device is constituted to control a throttle actuator connected to a throttle valve device (not shown) of the marine propulsion unit and a shift actuator connected to a forward/reverse shift device (not shown) by means of an operation lever and a control unit.

Each of the throttle actuator and the shift actuator is constituted by connecting a rack and pinion mechanism to a motor as a drive source, and connected to the throttle valve device or the shift device through a mechanical cable connected to a rack of the rack and pinion mechanism. In other words, the throttle control and the shift are performed by normal and reverse rotation of respective motors of the actuators. Here, displacement of the rack is detected by a rack position sensor (not shown) connected to the rack through a link. Actual control positions of the shift device and the throttle valve device are fed back to the control unit.

The operation lever is provided at a remote control box in a cockpit so as to be swung fore-and-aft directions. The remote control box is provided with a lever operation position sensor for detecting the swing direction and the swing angle of the operation lever. The swing action of the operation lever detected by the lever operation position sensor is converted into an electric signal and output to the control unit.

The control unit is constituted with a discriminating section for discriminating the type of operation from the swing direction and swing angle of the operation lever detected by the lever operation position sensor, comparison sections provided at the shift actuator and the throttle actuator respectively, a control section, and a drive section. The discriminating section is constituted to discriminate according to the signal output by the lever operation position sensor if the operation lever is in the shift range which is within a predetermined angle from a neutral position, or in the throttle range which is beyond the predetermined angle. If within the throttle range, the signal described above is sent to the comparison section connected to the shift actuator. If outside the range, the signal described above is sent to the comparison section connected to the throttle actuator.

The comparison sections are constituted to compare the control positions of each actuator input from the rack position sensor of the throttle actuator or shift actuator with the swing angle of the operation lever. The control section discriminates according to the comparison result of the comparison sections if the motor of each of the actuators is to be rotated in normal or reverse direction, and sends a control signal corresponding to the discrimination result to the drive section. The drive section is constituted to drive the motor in either normal or reverse direction according to the signal input from the control section. The electric circuit for the drive section has been usually of a structure with two P-channel MOS-FET and two N-channel MOS-FET connected a motor.

With the conventional remote control device constituted as described above, if the operation lever is swung to be tilted forward, for example, the control unit controls the shift actuator to the forward navigation side. If the swing angle of the operation lever is greater than a predetermined angle, the throttle actuator is controlled to increase throttle opening by a control amount corresponding to the swing angle. This control is performed in the same manner when the operation lever is swung to tilt backward.

The conventional remote control device using the motor-operated remote control system, however, has a problem of a high cost. This is because expensive components such as the actuator, drive circuit, motor, speed reduction mechanism, power MOS-FET as a power translator, etc. are required for two systems, namely for the throttle control and the shift control.

The object of the present invention is to reduce the cost when the throttle control and forward/reverse navigation shift are performed by a motor-operated actuator.

SUMMARY OF THE INVENTION

The remote control device for marine propulsion units according to the present invention is so constructed that motor-operated actuator as a single unit is capable of performing the shift between forward and reverse navigation by driving forward and reverse shift members and throttle opening and closing members by means of a single motor, and that said motor-operated actuator is connected to said operation means through a control unit.

The motor for the throttle control and forward/reverse shift, and electronic components for the speed reduction mechanism and motor drive circuit are required for only one system.

DETAILED DESCRIPTION OF THE PREFERRED EMBODIMENTS

Figure 10:
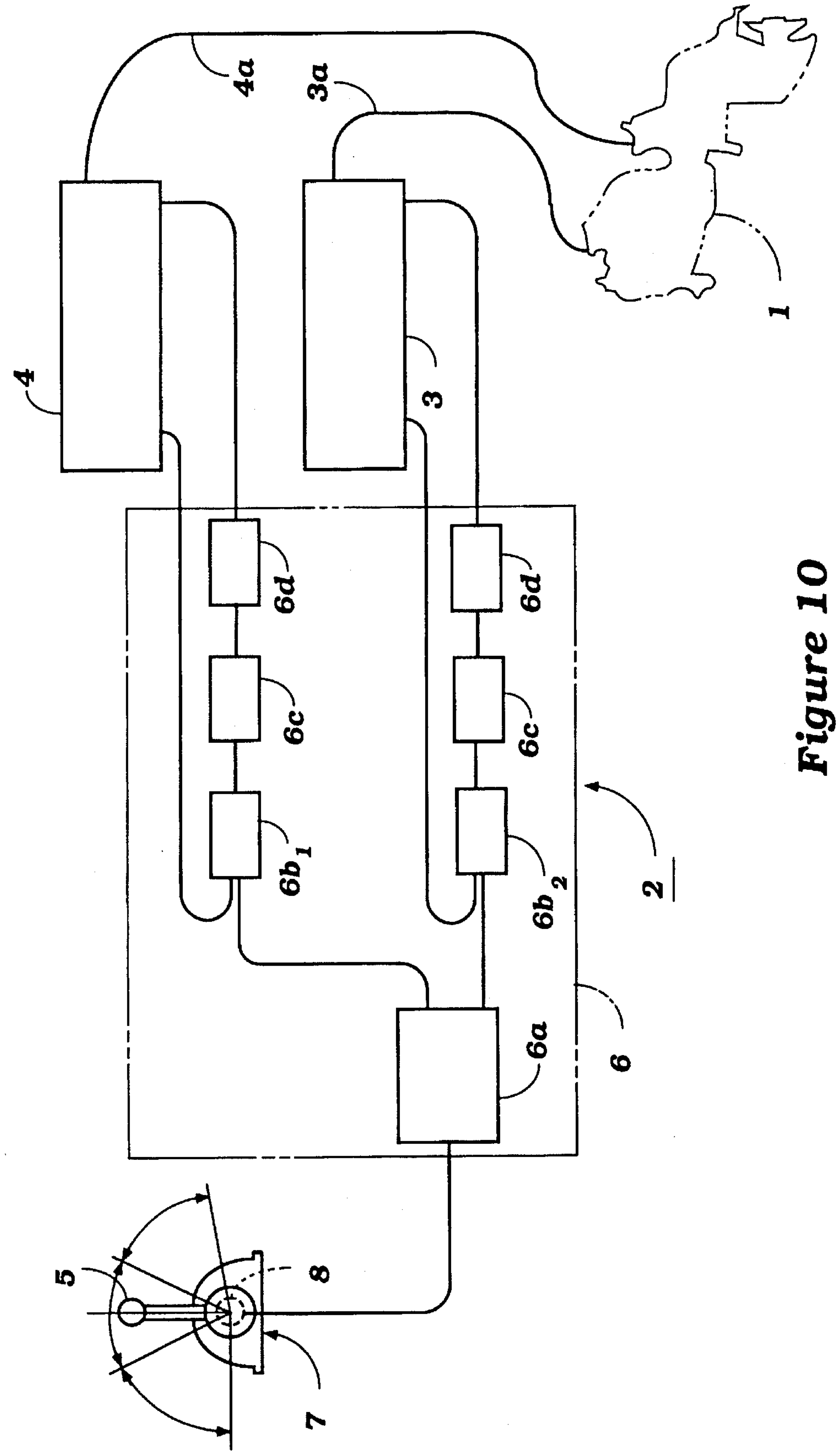
FIG. 10 is a schematic view of the conventional remote control device for a marine propulsion unit.

In these drawings, components which are identical or similar to those referred to in FIG. 10 are provided with the same symbol and detailed description thereof is omitted.

In these drawings is shown a remote control device 11 for a marine propulsion unit according to the present invention. The remote control device 11 comprises: an actuator 15 connected to a marine propulsion unit 12 through mechanical cables 13, 14 consisting of push-pull cables, a control unit 16 for controlling the actuator 15, an operation lever 5, and operation means consisting of operation lever 5 and a selection switch 17. The description of this embodiment is made with respect to a remote control device for use in a boat having cockpits in both cabin (not shown) and flying bridge (not shown). In other words, the operation lever 5 and the selection switch 17 are used in two sets because each cockpit is provided with one set.

The actuator 15 is provided with a motor described later, and constituted to perform forward/reverse shift and throttle control during forward or reverse navigation by rotating the motor in normal or reverse direction. To describe further in detail, first the forward/reverse shift device (not shown) of the propulsion unit 12 is shifted to the forward side by rotating the motor from a neutral position in the normal direction. Throttle opening of the throttle valve device (not shown) is gradually increased by continuing the rotation of the motor in the normal direction. If the motor is rotated from the neutral position in the reverse direction, first the forward/reverse shift device is shifted to the reverse side, and the throttle valve device is driven to gradually increase the throttle opening.

Figure 2:
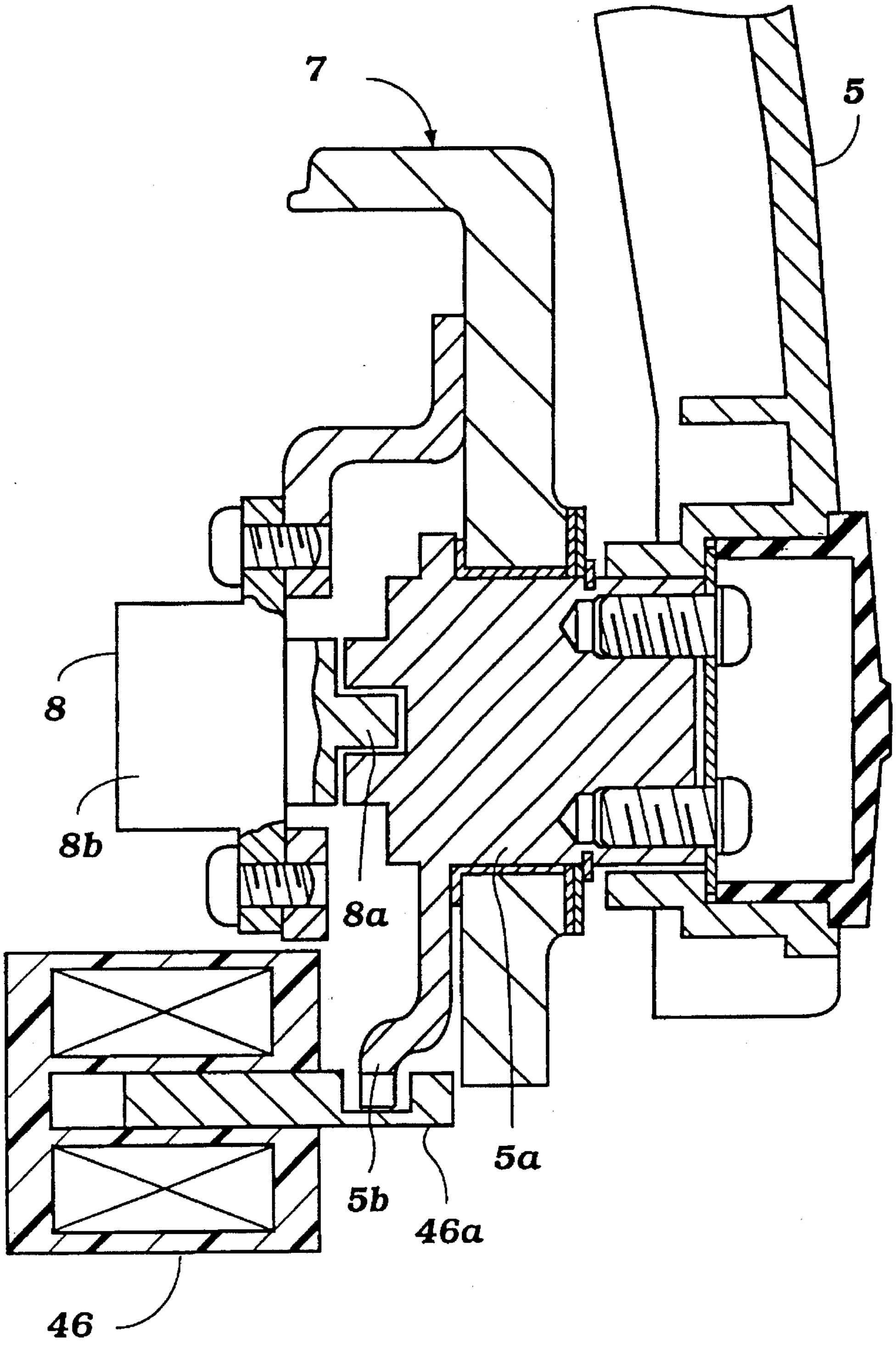
FIG. 2 is an enlarged cross-sectional view of the operation lever of the remote control device according to the present invention.

In order to change the rotating direction of the motor of the actuator 15, swing direction and swing angle of the operation lever 5 are detected by the lever operation position sensor 8, converted into electric signals, and input to the control unit 16. The structure of connecting the operation lever 5 to the lever operation position sensor 8 is shown in FIG. 2: the operation lever 5 is supported for free rotation through a horizontal shaft *5a* by the remote control box 7. A rotary shaft 8a of the lever operation position sensor 8 is fit into an axial end of the shaft *5a* located in the remote control box 7. The lever operation position sensor 8 is constituted to detect direction and angle of rotation of the rotary shaft *8a* relative to a body *8b* and input detected signals to the control unit 16, with the body *8b* secured to the remote control box 7.

The control unit 16 is constituted with a discrimination section 18, a comparison section 19, a control section 20, and a drive section 21. The discrimination section 18 is constituted to discriminate according to the signal output by the lever operation position sensor 8 if the operation lever 5 is in the shift range which is within a predetermined angle from a neutral position, or in the throttle range which is beyond the predetermined angle, and if in the shift range, outputs a forward navigation signal or a reverse navigation signal according to the swing direction to the comparison section 19. It is also constituted that if the lever 5 is in the throttle range, a throttle opening signal corresponding to the swing angle is output to the comparison section 19.

The comparison section 19 is constituted to compare the swing angle signal of the operation lever 5 with an actual control position signal of the actuator 15 input from a control position sensor of the actuator 15 which will be described later.

The control section 20 is constituted to determine the direction of rotation, and continuation or stop of rotation of the motor of the actuator 15 based on the comparison result at the comparison section 19, and the forward shift signal, reverse shift signal, or throttle opening signal output by the discrimination section 18. To describe the control at the control section 20 further in detail, if a forward shift signal is input, the motor is rotated in the normal direction so that the actual control position of the actuator 15 input to the comparison section 19 reaches a predetermined forward shift position. On the other hand, if a reverse shift signal is input, the motor is rotated in the reverse direction so that the actual control position of the actuator 15 input to the comparison section 19 reaches a predetermined reverse shift position. Here, the forward shift position described above refers to the control position of the actuator 15 when the forward/reverse shift device of the propulsion unit 12 is shifted to forward side by the actuator 15, and the reverse shift position described above refers to the control position of the actuator 15 when the forward/reverse shift device of the propulsion unit 12 is shifted to reverse side by the actuator 15.

Furthermore, if a throttle opening signal is input, the motor is rotated in the normal or reverse direction so that the actual control position of the actuator 15 input to the comparison section 19 corresponds to the swing angle of the operation lever 5. Here, the direction of the motor 22 rotation is normal if the shift range is on the forward navigation side, and reverse if the shift range is on the reverse navigation side. Here, setting is so made that the greater the swing angle of the operation lever 5 relative to the neutral position, the greater the throttle opening.

Figure 1:
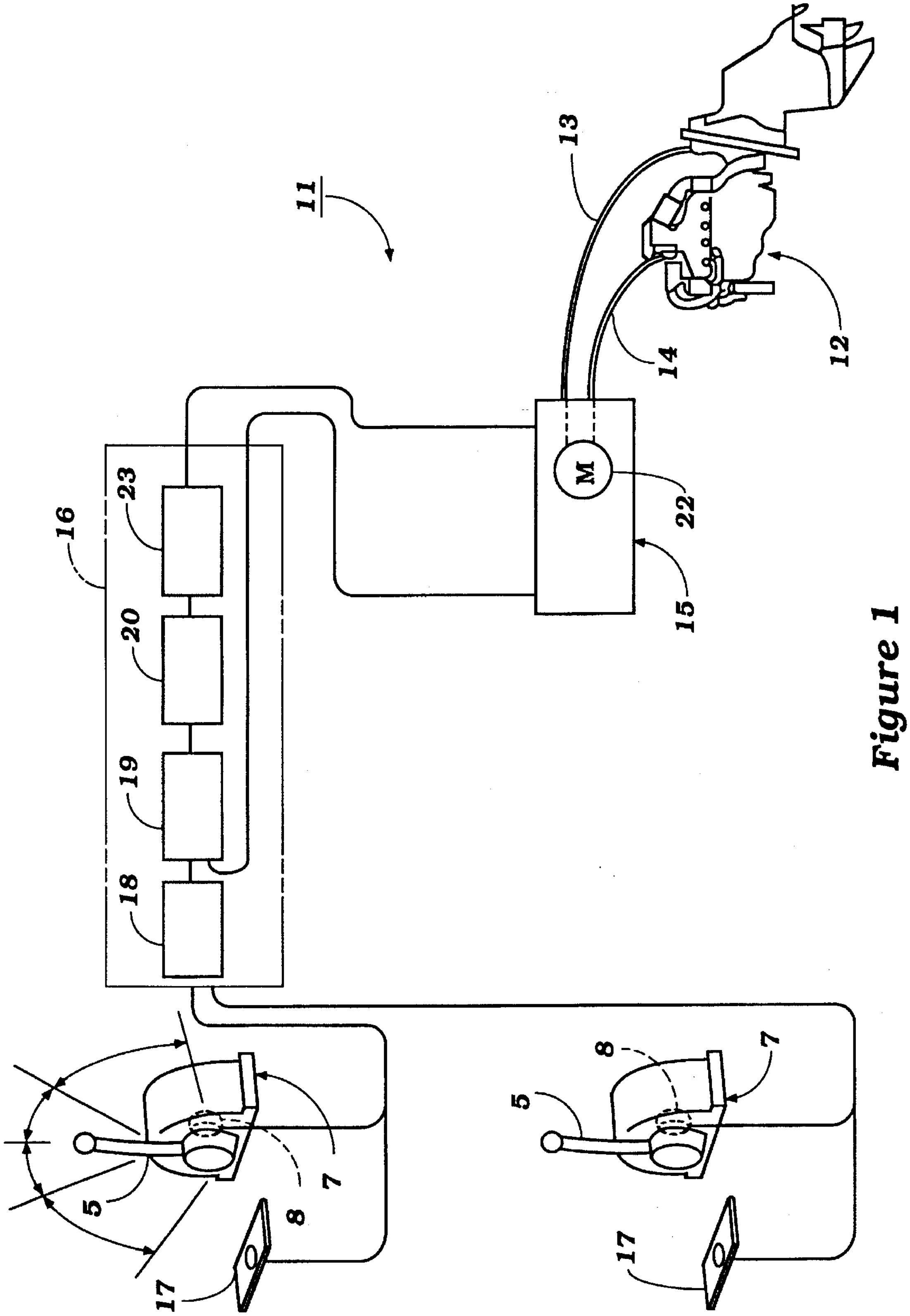
FIG. 1 is a schematic view of the remote control device for a marine propulsion unit according to the present invention.

In other words, if the operation lever 5 is tilted, for example, from the neutral position shown in FIG. 1 forward (forward navigation side) by about 90°, the discrimination section 18 outputs a forward shift signal and then outputs a throttle opening signal. Therefore, the control section 20 causes the motor to rotate in the normal direction so that the control position of the actuator 15 reaches the forward shift position. After that, the motor is rotated until the control position of the actuator 15 reaches a position corresponding to the swing angle of the operation lever 5. On the other hand, if the operation lever 5 is tilted backward by about 90° from the neutral position, the motor is rotated in the reverse direction so that the control position of the actuator 15 reaches the reverse shift position. After that, the motor is rotated further so that the control position of the actuator 15 reaches a position corresponding to the swing angle of the operation lever 5.

When the operation lever 5 is further swung within the shift range of forward or reverse navigation side, the discrimination section outputs only the forward shift signal or reverse shift signal corresponding to the swing direction. As a result, only the forward/reverse shift device of the propulsion unit 12 is driven by the actuator 15.

A selection switch 17 shown in FIG. 1 is a button switch for specifying which one of plurality of remote control boxes 7 is to be operated. The actuator is controlled only by the remote control box 7 specified by the selection switch 17. Therefore, the selection switch 17 is preferably provided in the vicinity of or integrally with the remote control box 7. Assuming that a remote control box other than the one currently in use is specified, if there is difference in the lever positions between the remote control box currently in use and the newly specified remote control box, sudden acceleration, sudden start, or sudden deceleration may occur, which is a surprise to an operator or passengers, which might lead to accidents such as falling on the boat or in the water. Therefore, the selection switch 17 is made effective only when the lever of the remote control box 7 is in the neutral position. It is also necessary to incorporate a safety control, for example, that if the lever of the remote control box 7 currently in use is not at the neutral position when another remote control box is specified, the actuator controls to gradually return the lever to the neutral position, and thereafter receives control from the remote control box 7.

Next, the structure of the actuator 15 for performing both throttle control and forward/reverse shift by a single motor will be described in reference to FIGS. 3–8.

Figure 3:
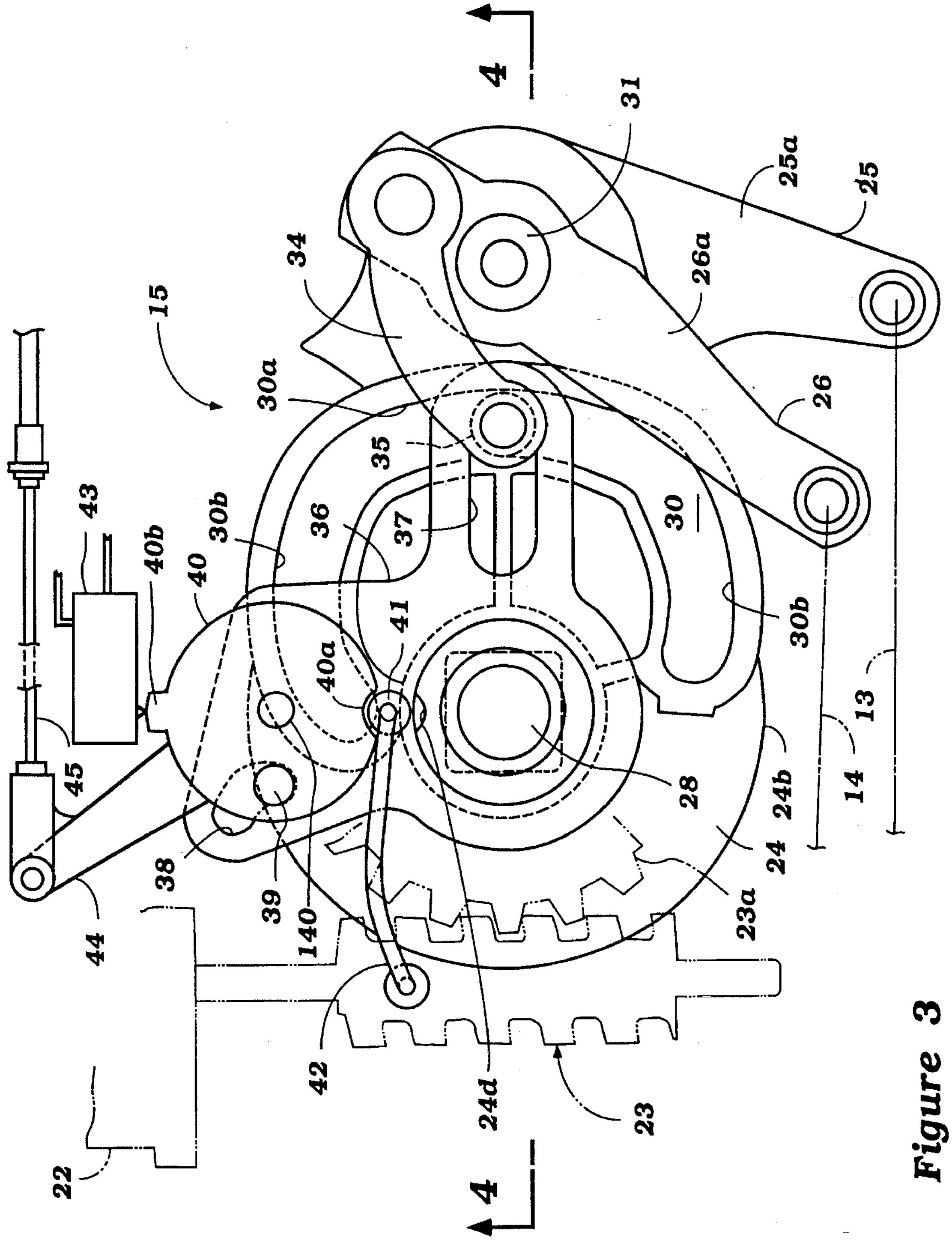
FIG. 3 is a plan view of an essential part of the actuator for use in the remote control device of the present invention.
Figure 4:
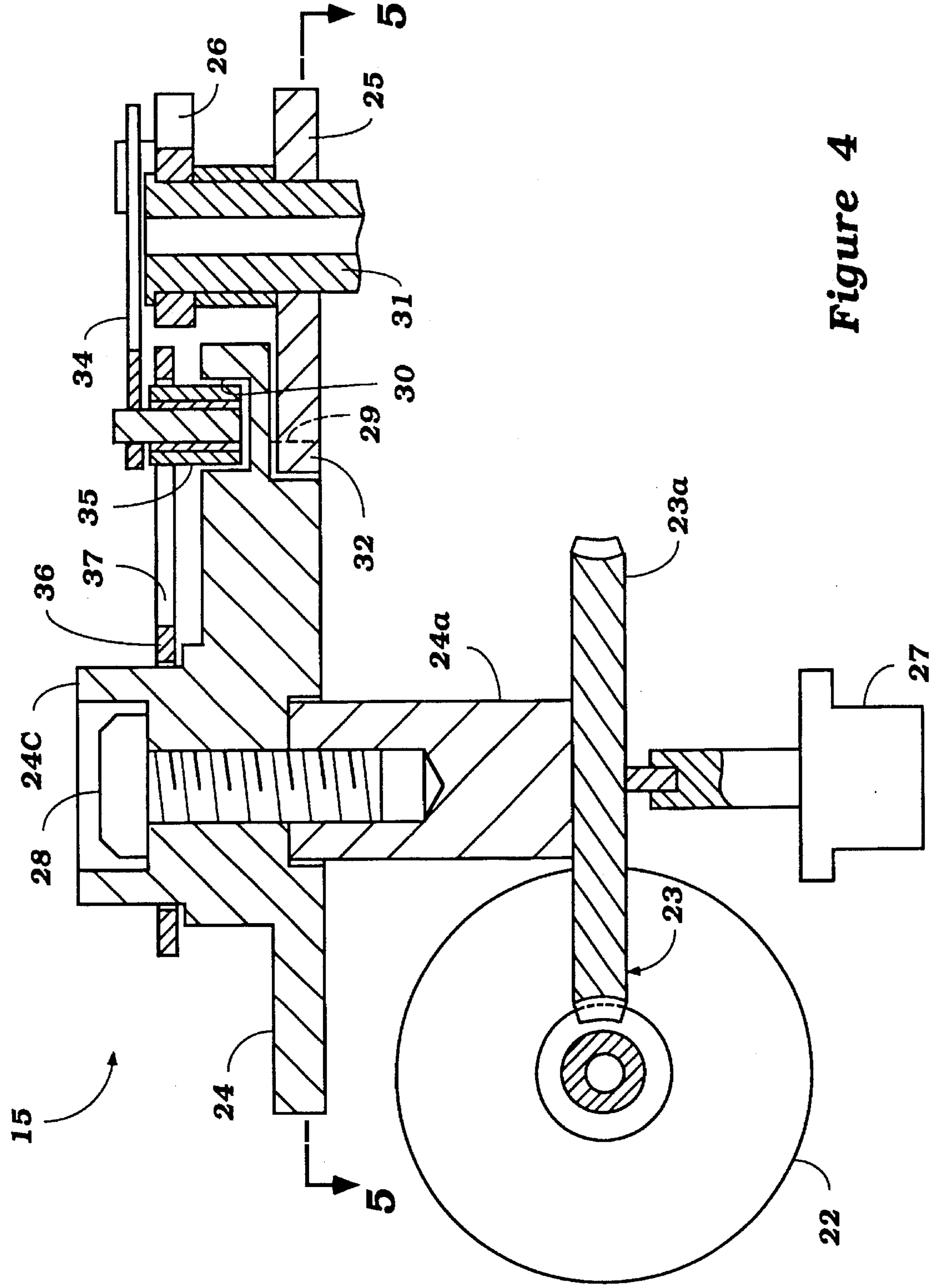
FIG. 4 is a cross-sectional view taken along the line IV—IV in FIG. 3.

The actuator 15 is supported for free rotation on a device case (not shown) with the actuator axis perpendicular to the plane of FIG. 3, and comprises: a rotary body 24 connected to a motor 22 through a worm gear 23, a forward/reverse shift lever 25 and a throttle control lever 26 connected to the rotary body 24, and a control position sensor 27 for detecting the rotary position (control position of the actuator 15). The motor 22 and the sensor 27 are connected to the control unit 16. This embodiment shows an example in which the forward/reverse shift member and the throttle opening/closing cam are integrally formed as the rotary body 24.

The rotary body 24 is formed in a circular disk shape as a whole with its underside center connected to a shaft member **24*a* through a square fit structure. A bolt 28 secures the shaft member 24*a* to the rotary body 24. A worm wheel 23*a* is secured to the shaft member 24*a*. A control position sensor 27 is connected to the underside center of the worm wheel 23*a*. The control position sensor 27 detects the rotation angle of the worm wheel 23*a* (rotary body 24) and gives an input to the control unit 16. The rotating direction of the motor 22 for the rotary drive of the rotary body 24 through the worm gear 23 is referred to as in the normal direction when the rotary body 24 rotates counterclockwise as seen in FIG. 3**.

Figure 5:
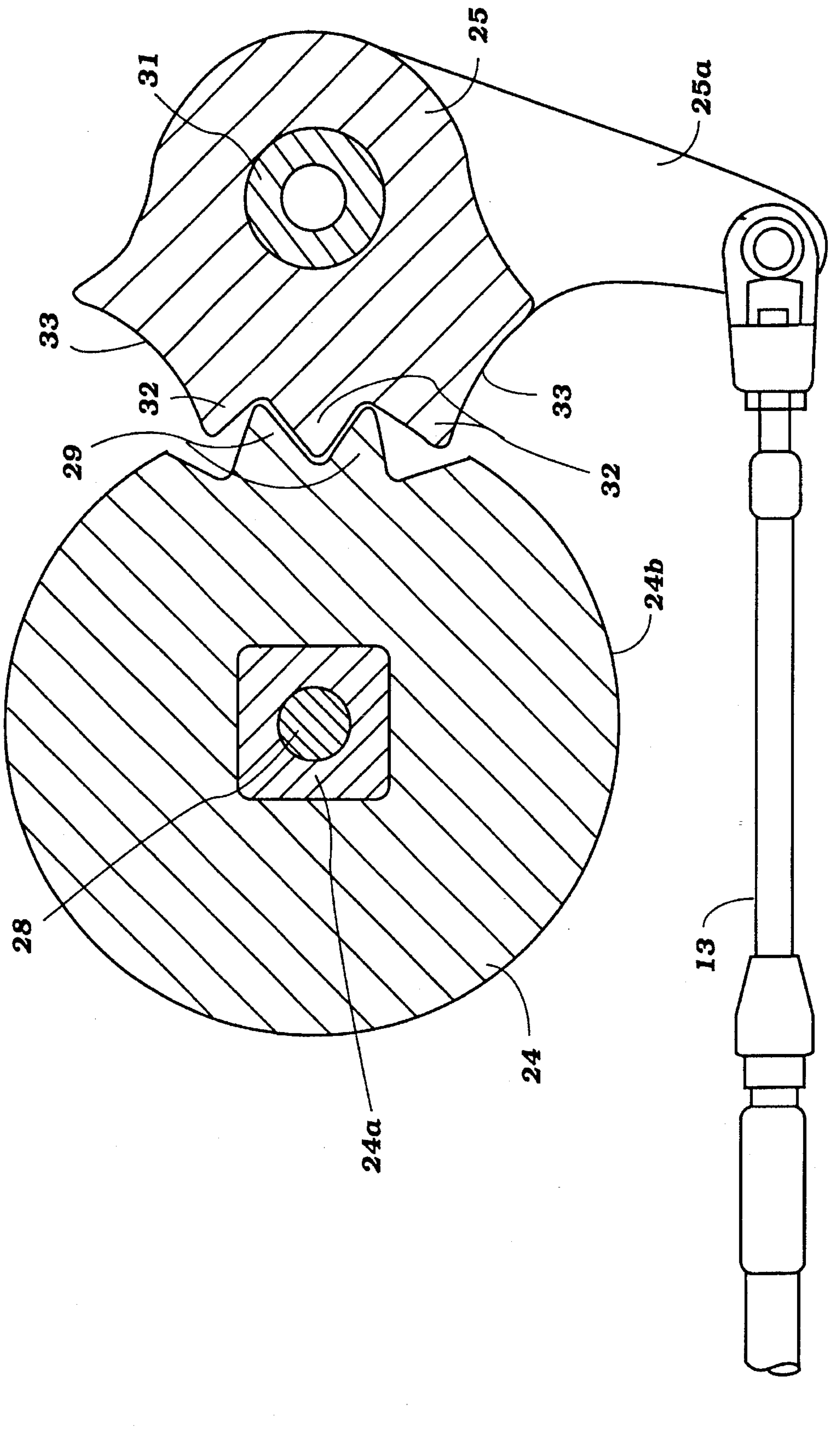
FIG. 5 is a plan cross-sectional view showing the constitution of the shift mechanism in the actuator, namely a cross-sectional view of a rotary body and the forward/reverse shift lever taken along the line V—V in FIG. 4.

An arrangement as the forward/reverse shift member is provided on the underside (in FIG. 4) of the rotary body 24 while an arrangement as the throttle opening/closing cam is provided on the upside of the rotary body 24. The underside of the rotary body 24 is formed as shown in FIG. 5 in a circular shape with a part of its outer circumference having gear teeth 29. A cam groove 30 open upward is formed at a portion corresponding to the teeth 29 on the upside of the rotary body 24.

The cam groove 30 is formed so that the portion of the groove 30 just above the teeth 29 is an arc about the center of the rotary body 24, with portions continuing to both ends of the arcuate portion constituting cams. The arcuate portion is provided with a symbol **30*a* and each of the cam portions with a symbol 30*b*. The cam portion 30*b* is formed so that its distance from the center of the rotary body 24 gradually decreases toward the end of the cam groove 30. The length of the arcuate portion 30*a* is set to correspond to the rotary range of the rotary body 24 when the forward/reverse shift lever 25** which will be described later is rotated.

The forward/reverse shift lever 25 is supported for free rotation on the device case through a support shaft 31 and formed with teeth 32 for engaging with the teeth 29 of the rotary body 24 and with concave surfaces 33 continuing to the teeth 32. The mechanical cable 13 connected to the forward/reverse shift device of the propulsion unit 12 is connected to an arm portion **25*a* extending downward from part of the lever 25. The concave surface 33 is formed with a radius of curvature approximately the same with that of the outer circumferential surface 24*b* of the circular portion formed on the underside of the rotary body 24**.

When the rotary body 24 rotates, for example, clockwise in FIG. 5, the forward/reverse shift lever 25 is rotated counterclockwise by the engagement of the teeth 29 with the teeth 32, and the arm portion **25*a* pulls the mechanical cable 13 to the right as seen on the drawing. The forward/reverse shift device of the propulsion unit 12 is constituted to be shifted to the reverse side when the mechanical cable 13 is pulled as described above. On the other hand, when the rotary body 24 is rotated in the opposite direction, the forward/reverse shift device is shifted to the forward side. The forward/reverse shift device is constituted to be in the neutral position when the rotary body 24 is in the position shown in FIGS. 3 and 5**.

Figure 6:
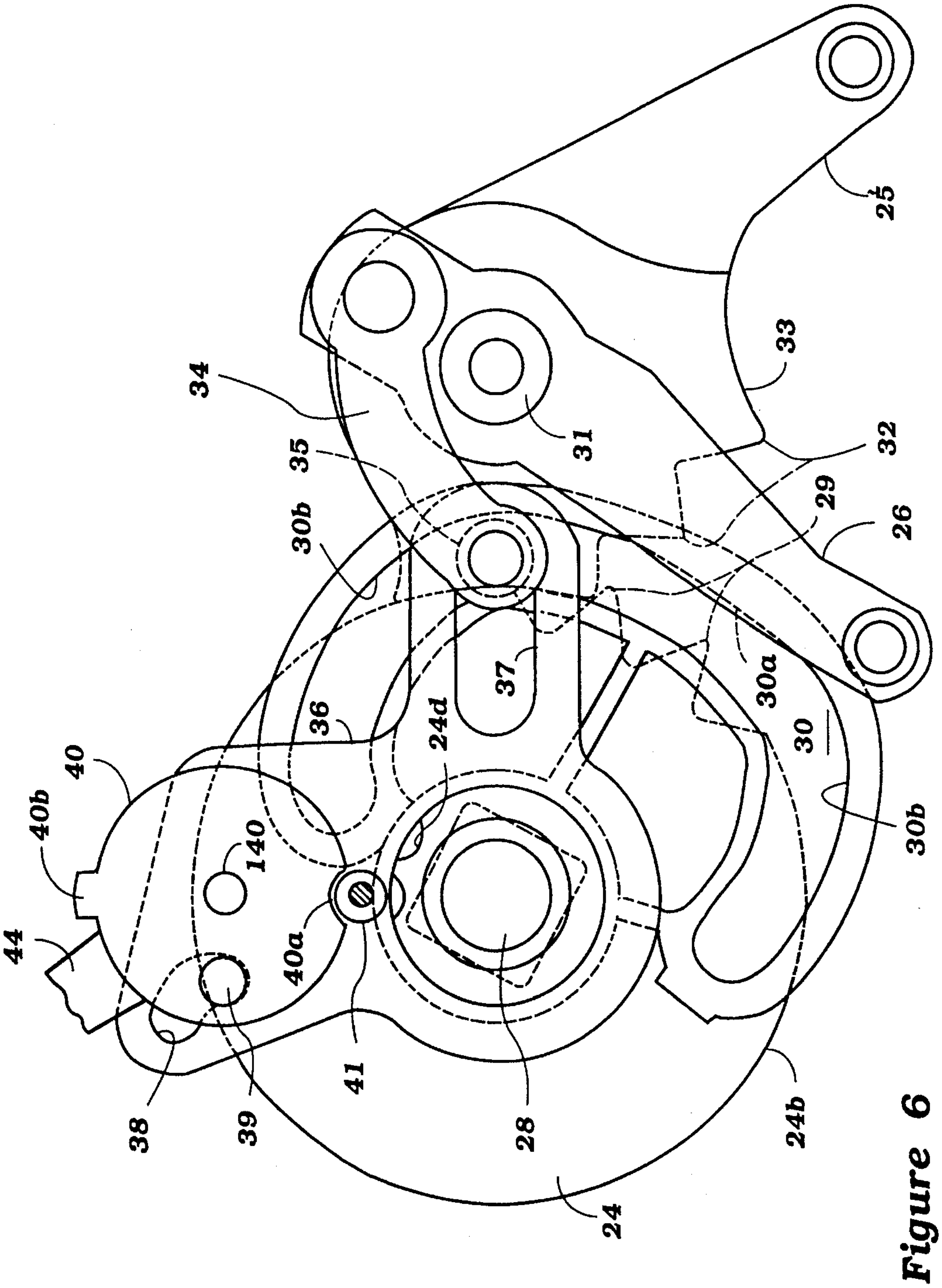
FIG. 6 is a plan view of an essential part of the actuator, with the throttle valve device in the state of idling and with the forward/reverse shift device in the state of being shifted to reverse side.

When the rotary body 24 further rotates and the teeth 29 disengage from the teeth 32, as shown in FIG. 6, the concave surface 33 of the forward/reverse shift lever 25 comes into contact with the outer circumferential surface **24*b* of the rotary body 24. Under that condition, even if the rotary body 24 rotates further, the forward/reverse shift lever 25 remains in the rotated position described above as shown in FIG. 7 as the concave surface 33 comes into contact with the outer circumferential surface 24*b*. In other words, although the forward/reverse shift lever 25 rotates together with the rotary body 24 when the rotary body 24 rotates from the neutral position shown in FIGS. 3 and 5 within a certain range of rotation as far as the teeth 29 and the teeth 32 are in engagement with each other, the lever 25 does not rotate together with the rotary body 24 and remains at rest even if the rotary body 24 further turns beyond the rotation range. The rotary positions of the rotary body 24 where the forward/reverse shift lever 25** stops rotation respectively correspond to the forward shift position and the reverse shift position.

The throttle control lever 26 is supported for free rotation on the support shaft 31 which supports the forward/reverse shift lever 25. A mechanical cable 14 is connected to an arm portion **26*a* extending from the support shaft portion. One end of a link member 34 is connected for free rotation to a portion extending in the direction opposite to that of the arm portion 26*a*. A roller 35 is attached to the end opposite to the throttle control lever 26 of the link member 34. The roller 35 side end of the link member 34 is connected to the rotary body 24 as the roller 35 is brought into sliding engagement with the cam groove 30 of the rotary body 24. The roller 35 is also brought into engagement with a guide slot 37 of a guide plate 36 rotatably fit into a central boss 24c of the rotary body 24**.

The guide plate 36 as shown in FIG. 3 is formed in an L shape, as seen in plan view. The elongate guide slot 37 is formed to extend in the radial direction of the rotary body 24 on an arm extending to the first in FIG. 3. A V-shaped engagement slot 38 is formed on another arm extending upward in FIG. 3. The guide plate 36 engages for free rotation with the central boss 24c of the rotary body 24, and has the engagement slot 38 to be engaged with a pin 39 planted on a disk 40 for rotation about a shaft 140. When the disk 40 is in the position shown in FIG. 3, the guide plate 36 is restricted from rotating about the boss portion 24c by the presence of the pin 39. The disk 40 has a semicircular recess 40a. A cylindrical member 41 of a stopper 42 is pressed against the semicircular recess 40a. The stopper 42 is made of an elastic material and presses the cylindrical body 41 against the disk 40 by its own resilience, with the end opposite to the cylindrical member 41 secured to the device case.

A projection 40b is formed on the radially opposite side to the semicircular recess 40a on the disk 40 to be in contact with an actuation piece of a limit switch 43 which will be described later. In the state shown in FIG. 3, the disk 40 is pressed against the limit switch 43 by the stopper 42 and held in the position shown in the drawing as sandwiched by the stopper 42 and the limit switch 43.

Figure 7:
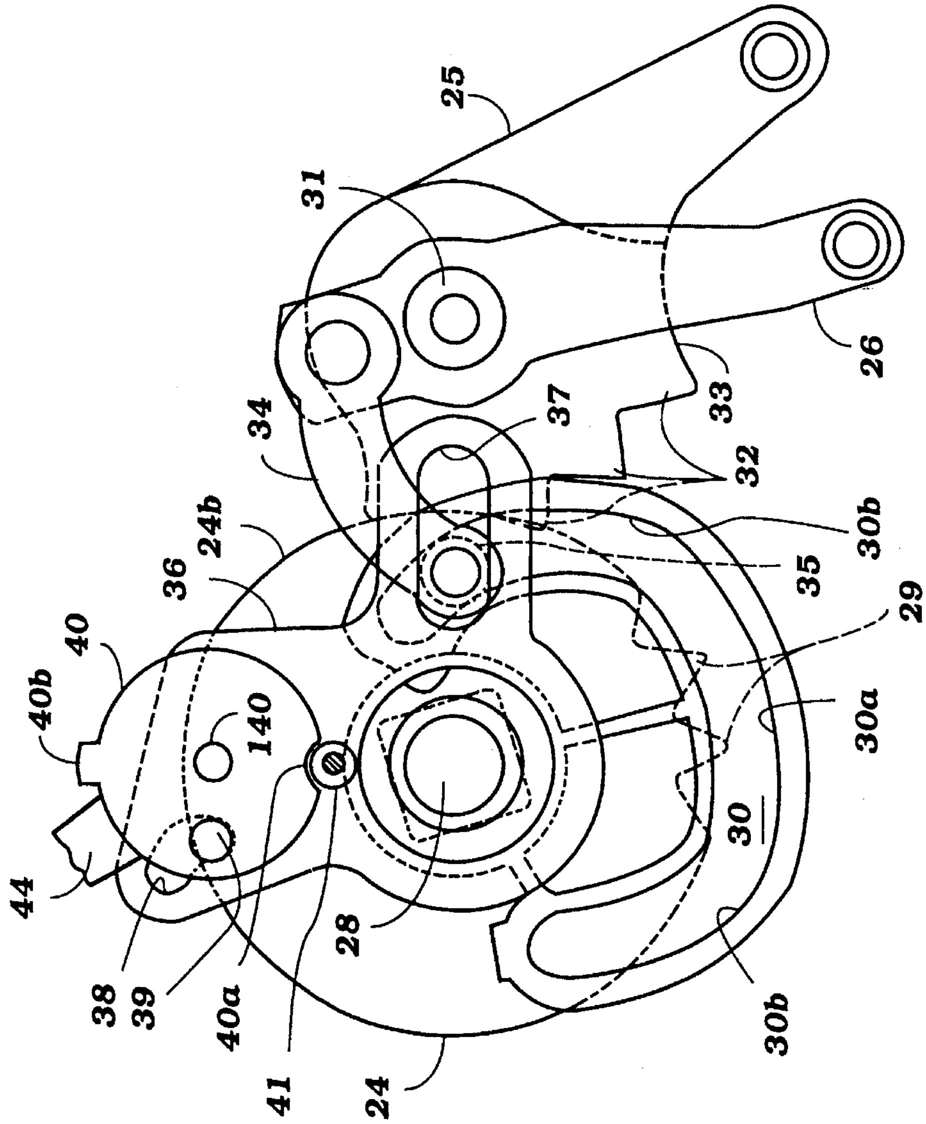
FIG. 7 is a plan view of an essential part of the actuator, with the forward/reverse shift device being shifted to reverse side and with the throttle valve device being brought to almost wide open state.

Since up and down movement in FIG. 3 of the roller 35 is restricted by the guide plate 36, when the rotary body 24 rotates counterclockwise from the neutral position shown in FIG. 3, the arcuate portion 30a of the cam groove 30 moves relative to the roller 35 as far as the rotary angle of the rotary body 24 is within a certain small range. As shown in FIGS. 6 and 7, when the rotary angle of the rotary body 24 exceeds the certain small range, the roller 35 passes the junction portion between the arcuate portion 30a and the cam portion 30b to come into sliding contact with the cam portion 30b. When the roller 35 comes into sliding contact with the cam portion 30b, the roller 35 moves along the guide slot 37 in response to the rotation of the rotary body 24 toward the center of the rotary body 24. When a link member 34 having the roller 35 moves, a throttle control lever 26 is rotated counterclockwise, as seen in the drawing. When the throttle control lever 26 is rotated counterclockwise, the mechanical cable 14 connected to the arm portion 26a is pulled. If the rotary member 24 is rotated in the direction opposite to that described above, the roller 35 comes into sliding contact with the cam portion 35b located opposite to the cam portion 30b described above, and the throttle control lever 26 is rotated also counterclockwise and the mechanical cable 14 is pulled.

The throttle valve device, connected to the mechanical cable 14, of the propulsion unit 12 is constituted so that the throttle opening is gradually increased when the mechanical cable 14 is pulled. The throttle control device is constituted so that the propulsion unit 12 is in the idling state when the mechanical cable 14 is not pulled as shown in FIG. 3.

The length of the arcuate portion 30a of the cam groove 30 is set to a value so that the rotary angle of the rotary body 24 when the teeth 29 formed below the cam groove 30 engage with the teeth 32 of the forward/reverse shift lever 25 agrees with the center angle of the arc in the arcuate portion 30a. In other words, when the forward/reverse shift lever 25 rotates together with the rotary body 24, the throttle control lever 26 is held in the neutral position because the roller 35 is located in the arcuate portion 30a. When the forward/reverse shift lever 25 does not respond to the movement of the rotary body 24 any more (when the teeth 29 and 32 disengage from each other and the forward reverse shift device is shifted to either forward or the reverse shift position), the throttle control lever is rotated toward wide open throttle position.

Figure 8:
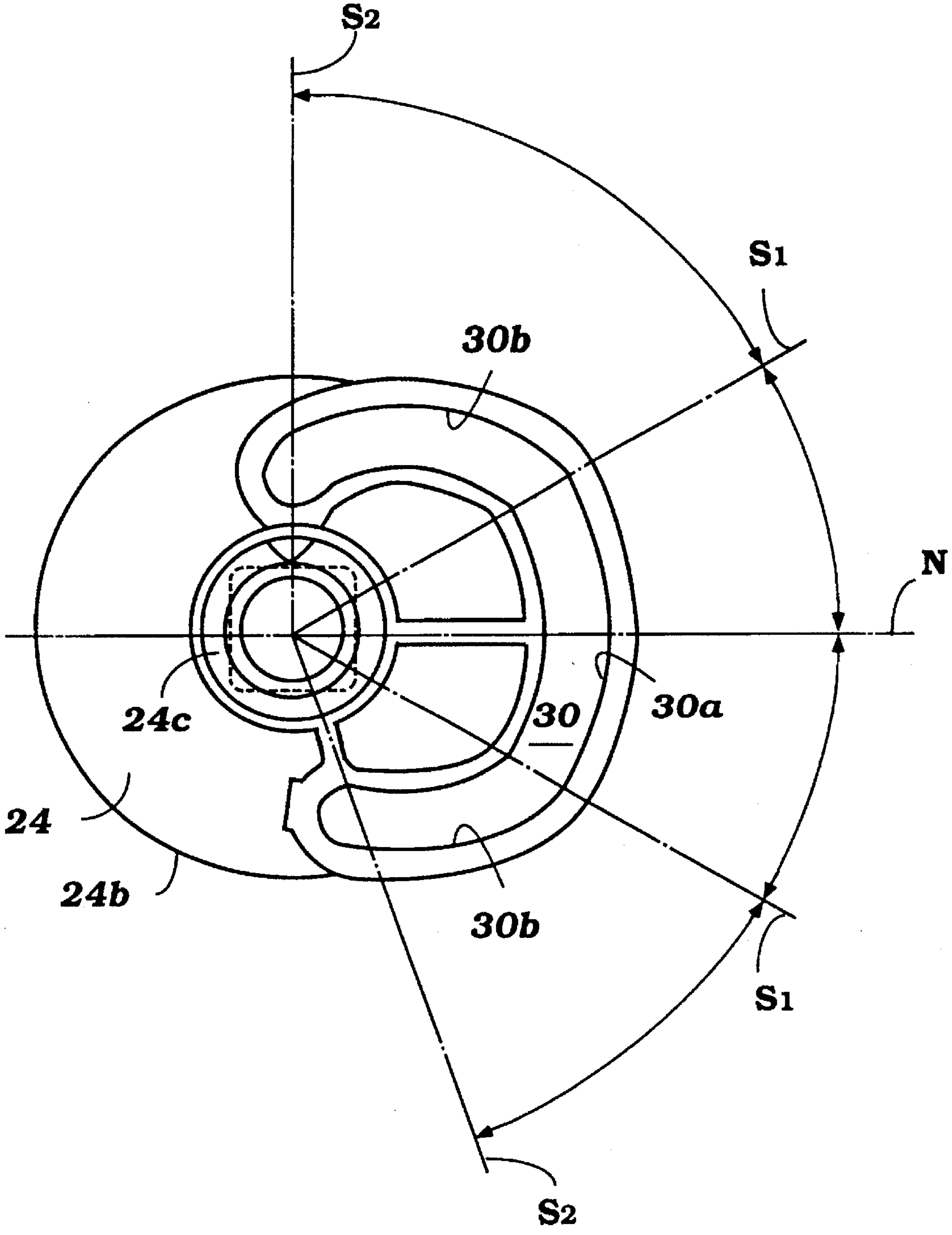
FIG. 8 is a plan view of a throttle opening/closing cam for use in the actuator.

The operating timing of those levers 25 and 26 will be described in reference to FIG. 8. In FIG. 8, the single dotted chain line (N) is the neutral position line extending between the center of the rotary body 24 and the axes of the levers 25 and 26. The symbol 30b $S_1$ denotes a shift end line passing the border between the arcuate portion 30a of the cam groove 30 and the cam portion 30b. The symbol 30b $S_2$ denotes a wide open throttle line passing the fore-end portion of the cam portion 30b. Namely, when the rotary body 24, shift end line $S_1$, and wide open throttle line ($S_2$) move from the neutral position, until the shift end line ($S_1$) is lined up with the neutral position line (N), the forward/reverse shift lever 25 only rotates, and when the neutral position line (N) is in the range between the shift end line $S_1$ and the wide open throttle line $S_2$, only the throttle control lever 26 rotates.

Here, the structure of the disk 40 for restricting the rotation of the guide plate 36 relative to the rotary body 24 will be described. The disk 40 has an integrally formed free throttle lever 44 and connected to a warm-up operation lever (not shown) in the cockpit through the free throttle lever 44 itself, and a warm-up throttle cable 45. In FIG. 3, if the warm-up operation lever is pulled, the disk 40 is pulled together with the free throttle lever 44 to produce a clockwise rotary force about the shaft 140. The cylindrical member 41 in engagement with the semicircular recess 40a is pushed while resisting against the elastic force of the stopper 42 toward the center of the rotary body 24, and faces a semicircular recess 24d formed in a central boss portion 24c of the rotary body 24 and the engagement by the stopper 42 is released. As a result, the disk 40 rotates clockwise as seen in FIG. 3 about the shaft 140 and at the same time causes the guide plate 36 to rotate clockwise through the slot 38 in the guide plate 36.

At this time, the projection 40b of the disk 40 moves away from the actuation piece of the limit switch 43 and the limit switch 43 is turned off. The limit switch 43 is connected to a lever operation prohibiting solenoid 46 shown in FIG. 2 through a solenoid drive circuit (not shown). The lever operation prohibiting solenoid 46 is constituted so that when the limit switch 43 is on, a drive pin 46a is pulled back so as to engage with a lever 5b of a support shaft 5a. In other words, when the disk 40 moves relative to the rotary body 24, the lever 5 is made inoperable.

When the guide plate 36 is rotated clockwise by the warm-up throttle lever, the roller 35 moves along the arcuate portion 30a of the cam groove 30, and the throttle control lever 26 is rotated counterclockwise by the movement of the link member 34 having the roller 35. As a result, the throttle device of the propulsion unit 12 is driven toward wide open throttle side to increase the revolution of an engine. Here, the forward/reverse shift device is not driven and remains in the neutral position. Here, when the rotary body 24 is rotated and the throttle control and forward/reverse shift are being performed, as shown in FIGS. 6 and 7, the cylindrical member 41 of the stopper 42 is in contact with the outer circumferential surface 24*b* of the central boss portion 24*c* of the rotary body 24, and the engagement between the cylindrical member 41 and the semicircular recess 40*a* cannot be released, and therefore, the warm-up operation lever cannot be operated.

Next, the function of the remote control device 11 of the present invention will be described.

When the operation lever 5 is operated within the shift range shown in FIG. 1, the control unit 16 causes the motor of the actuator 15 to rotate in normal or reverse direction according to the operating direction. If operated forward, for example, the motor 22 is rotated in the normal direction, and the rotary body 24 of the actuator 15 is rotated clockwise in FIG. 3. Then the rotary body 24 is rotated until it reaches the forward shift position. Whether the rotary body 24 has reached the forward shift position or not is discriminated by comparing the rotary angle of the rotary body 24 detected by the control position sensor 27 with a predetermined value. This comparison is performed by the comparison section 19 of the control unit 16.

By the rotation of the rotary body 24 up to the forward or reverse shift position, the forward shift lever 25 is rotated and the forward/reverse shift device of the propulsion unit 12 is driven.

When the operation lever 5 is tilted forward or backward beyond the shift range, the control unit 16 controls the motor 22 of the actuator 15 so that the rotary angle of the rotary body 24 detected by the control position sensor 27 agrees with the swing angle of the operation lever 5. In other words, rotary position of the throttle control lever 26 is controlled by changing the position of the cam portion 30*b* relative to the roller 35. At this time, the rotary angle of the throttle control lever 26 increases with the increase in the swing angle of the operation lever 5, and accordingly, the throttle valve opening of the throttle valve device of the propulsion unit 12 increases gradually.

As described above, in the remote control device 11 of the present invention for the marine propulsion units, the motor-operated actuator 15 is constituted so that the forward/reverse shift member and the throttle opening/closing cam member (integrally constituted as the rotary body 24) are driven by a single motor 22 to perform both throttle control and forward/reverse shift by the remote control device 11 as a single unit, and the actuator 15 is connected to the operation means (the operation lever 5 and the selection switch 17). As a result, the number of the motor required for the throttle control and forward/reverse shift, and of the electronic components required for the speed reduction mechanism and the motor drive circuit is reduced to that for only one system.

As shown by this embodiment, with the constitution in which the concave surface 33 of the forward/reverse shift lever 25 is brought into sliding contact with the outer circumferential surface 24*b* of the rotary body 24 when the throttle control is performed by the actuator 15, even if a force is exerted from the forward/reverse shift device of the propulsion unit 12 to the forward/reverse shift lever 25 through the mechanical cable 13, since the concave surface 33 serves as a stopper, the forward/reverse shift lever is retained in the forward or reverse shift position.

Figure 9:
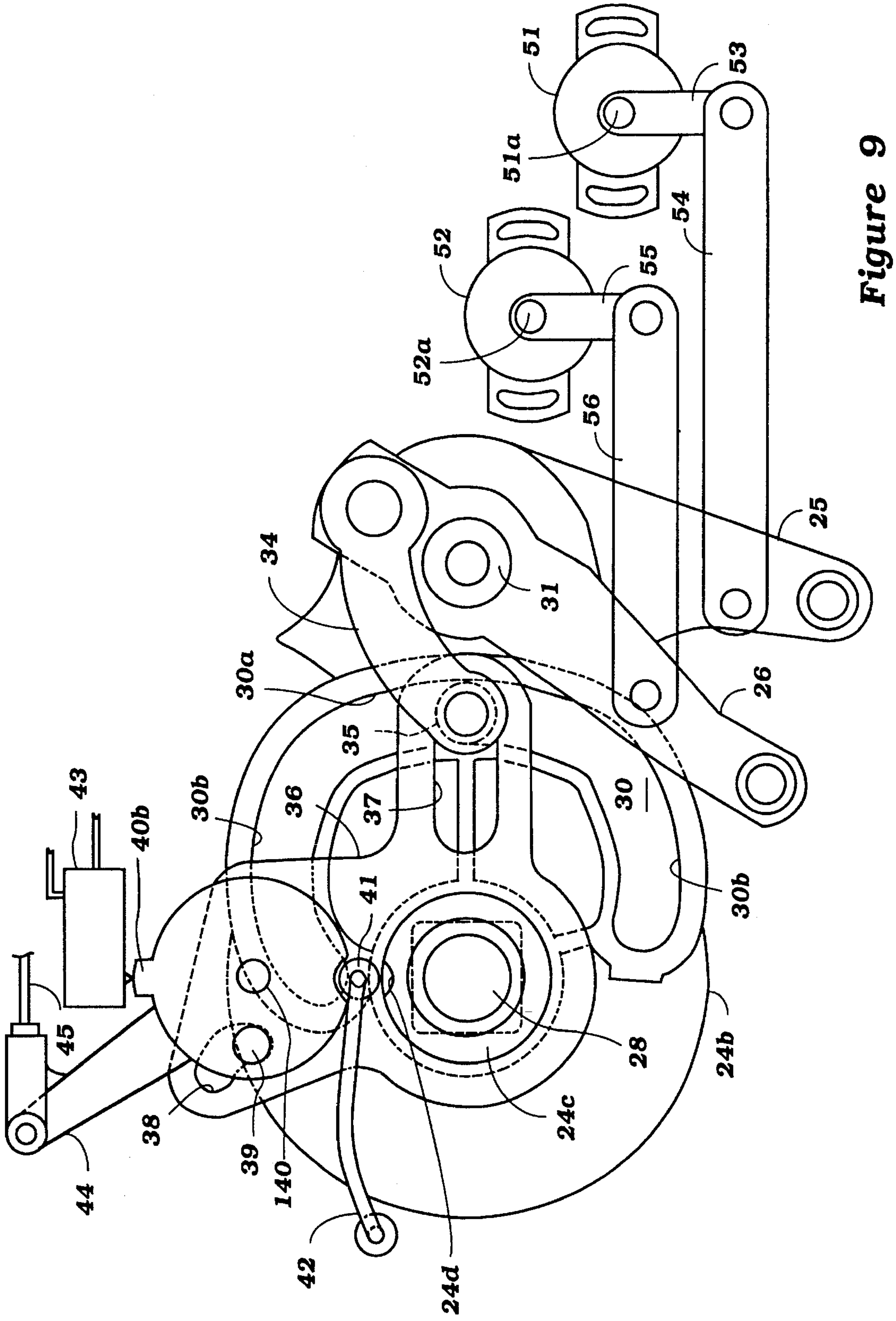
FIG. 9 is a plan view of another embodiment of the actuator.

Detection of the rotary position of the rotary body 24 may also be arranged as shown in FIG. 9.

FIG. 9 is a plan view of another embodiment of the actuator 15 in which the components identical or similar to those shown in FIGS. 3-8 are provided with the same symbols and detailed description is omitted.

FIG. 9 shows a sensor 51 for detecting the forward shift position and the reverse shift position, and a sensor 52 for detecting the throttle opening. These sensors 51 and 52 are constituted to detect rotary angles of the rotary shafts 51*a* and 52*a* and to input signals to the control unit 16. An arm 53 is secured to the rotary shaft 51*a* of the sensor 51 connected to the forward/reverse shift lever 25 through a link 54 pivoted to the arm 53. An arm 55 is secured to the rotary shaft 52*a* of the sensor 52 connected to the throttle control lever 26 through a link 55 pivoted to the arm 55.

The constitution described above makes it possible to eliminate adverse effect of play among the gears, cams and links so that the throttle control and forward/reverse shift are performed with a higher accuracy.

The example shown in FIG. 9 is of a constitution in which the actions of the forward/reverse shift lever 25 and the throttle control lever 26 are transmitted to the sensors 51 and 52 through the links 54 and 56. However, it may also be constituted that the rotations of the forward/reverse shift lever 25 and the throttle control lever 26 are directly detected by the sensors 51 and 52. Or it may also be constituted that the forward/reverse shift lever 25 and the throttle control lever 26 are provided with cams, and the sensors 51 and 52 are provided with potentiometer arms for coming into contact with the cams.

As described above, in the remote control device according to the present invention for the marine propulsion units, the motor-operated actuator is constituted so that the forward/reverse shift member and the throttle opening/closing cam member are driven by a single motor to perform both throttle control and forward/reverse shift by the remote control device as a single unit, and the actuator is connected to the operation means. As a result, the number of the motor required for the throttle control and forward/reverse shift, and of the electronic components required for the speed reduction mechanism and the motor drive circuit, is reduced to that for only one system.

Therefore, the number of expensive components for performing the throttle control and forward/reverse shift by the motor-operated actuator is reduced to the minimum so that the remote control device is provided at a low cost.

I claim:

1. A remote control for a marine propulsion unit having a speed control movable from an idle position through a range of positions to a full throttle position and a transmission control movable between a neutral drive position and a forward drive position, said remote control comprising an operator movable between a first position through a plurality of intermediate positions to a second position, sensor means for sensing the position of said operator, a single servo motor, a transmission device for coupling said single servo motor to said speed control for moving said speed control between its idle position and its full throttle position and to said transmission control for moving said transmission control from its neutral drive position to its forward drive position, and control means responsive to the output of said sensor means for operating said single servo motor to place said speed control and said transmission control in their respective positions corresponding to the position of said operator.

2. A remote control as in claim 2, wherein the transmission device first moves the transmission control from its neutral drive position to its forward drive position and then moves the speed control from its idle position toward its full throttle position when the operator is moved from its first position toward its second position by a predetermined degree.

3. A remote control as in claim 2, further including an idle warm-up control and means coupling said idle warm-up control to the transmission device for moving the speed control from its idle position to a partial throttle position without effecting movement of the transmission control.

4. A remote control as in claim 3, wherein the transmission control is locked in its neutral condition when the warm-up idle control is actuated.

5. A remote control as in claim 1, wherein the transmission control is movable from its neutral drive position in a direction opposite from its forward drive position to a reverse drive position and wherein the operator is movable from the first position through a plurality of positions in a direction opposite the second position to a third position, and the transmission device couples the single servo motor to the speed control and transmission control for moving the transmission control from its neutral position to its reverse position and for moving said speed control from its idle position toward its full throttle position upon movement of said operator from its first position toward its third position.

6. A remote control as in claim 5, wherein movement of the operator from its first position in a predetermined degree toward its second or third positions effects movement of the transmission control from its neutral position to its forward drive position or its reverse drive position, respectively, before the speed control is moved from its idle position toward its full throttle position.

7. A remote control as in claim 6, wherein the transmission device comprises a cam and follower mechanism.

8. A remote control as in claim 7, wherein the transmission control and the speed control comprise a pair of pivotally supported levers rotatable about a common axis and each operated by the cam and follower mechanism.

9. A remote control as in claim 8, wherein the cam and follower mechanism comprises a sector gear engageable with a corresponding sector gear fixed to the transmission control for effecting pivotal movement of the transmission control from its neutral position toward its forward drive position or its reverse drive position, depending upon which direction the sector gear of the cam mechanism is driven by the servo motor, and further including a locking portion for retaining the transmission control lever in its forward drive position and its reverse drive position upon continued rotation of the dam and follower mechanism.

10. A remote control as in claim 8, wherein the speed control lever has a further lever pivotally connected to it and engaged in a cam track formed on the cam of the cam and follower mechanism for effecting an idle operation of the throttle control during a first degree of rotation of the cam in either direction from a first position and thereafter effecting movement of the speed control lever from its idle position toward its full throttle position.

11. A remote control as in claim 10, wherein the cam and follower mechanism comprises a sector gear engageable with a corresponding sector gear fixed to the transmission control for effecting pivotal movement of the transmission control from its neutral position toward its forward drive position or its reverse drive position, depending upon which direction the sector gear of the cam mechanism is driven by the servo motor and further including a locking portion for retaining the transmission control lever in its forward drive position and its reverse drive position upon continued rotation of the cam mechanism.

12. A remote control as in claim 11, further including a warm up control moveable between a normal operation position and a warmup position and a further cam and follower mechanism for operating the speed control from its idle position to a partial throttle position in response to operation of the warm-up control from its normal operation position to its warmup position, said warm-up control further having an interlock mechanism for precluding operation of the transmission device when the warm-up control is in its warm-up position.

* * * * *